(12) United States Patent
Krom

(10) Patent No.: US 6,205,019 B1
(45) Date of Patent: Mar. 20, 2001

(54) CIRCUIT BREAKER SWITCHBOARD, SINGLE ROW GROUP MOUNTED

(75) Inventor: Thomas J. Krom, Lebanon, TN (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/263,705

(22) Filed: Mar. 5, 1999

(51) Int. Cl.$^7$ .................... H02B 1/20; H05K 7/20
(52) U.S. Cl. ............... 361/637; 361/639; 361/648; 361/650; 361/678; 174/72 B; 174/16.2
(58) Field of Search ............... 174/16.2, 71 B, 174/72 B, 70 B, 88 B, 99 B, 129 B, 133 B; 361/611–624, 637–640, 641, 644, 648–650, 678, 690, 831–832

(56) References Cited

U.S. PATENT DOCUMENTS

| | | | |
|---|---|---|---|
| 3,349,291 | * 10/1967 | Olashaw | 361/624 |
| 3,780,355 | * 12/1973 | Salvati et al. | 174/72 B |
| 5,124,881 | * 6/1992 | Motoki | 361/611 |
| 5,166,861 | * 11/1992 | Krom | 361/678 |

* cited by examiner

Primary Examiner—Gregory Thompson
(74) Attorney, Agent, or Firm—Kareem M. Irfan; Larry I. Golden

(57) ABSTRACT

A switchboard for mounting and supplying electrical power to a plurality of circuit breakers has all the breakers are mounted on one side of a vertical power stack. The power stack has vertical buses to which the breakers are connected. Insulators and spacers provide air ventilation paths through the power stack. The main bus connecting members on the other side of the power stack from the breakers and are spaced apart vertically to allow for improved heat dissipation. By using vertical bus connectors, the bus connecting members may be connected to through bus connectors at any height on the back of the switchboard. The main bus connecting members are in a vertical chimney for improved heat dissipation. The circuit breaker at the highest location (the "A" phase) has the highest temperature and in the present invention, the main bus connecting member for the A phase is in the highest position to place it closest to the heat source and thereby improve the heat conduction away from the breakers. The improved air flow design allows for an increased height of the assembly and the mounting of breakers of any size to be mounted in any location on the powerstack. The location of the breakers on one side of the power stack allows the switchboard to be narrower, freeing up room for other devices. The depth of the enclosure is reduced due to the improved heat conduction.

19 Claims, 12 Drawing Sheets

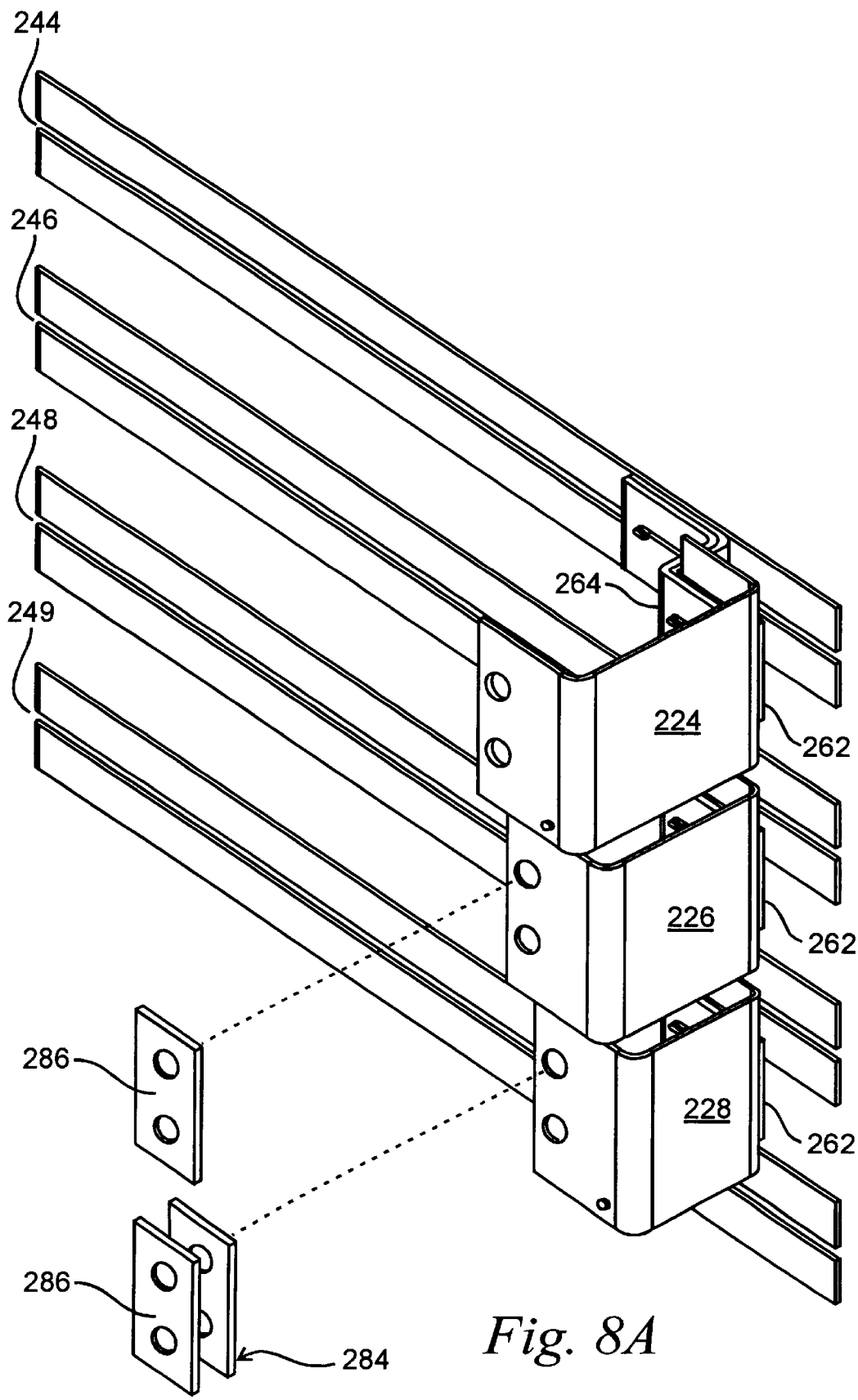

CIRCUIT BREAKER SWITCHBOARD, SINGLE ROW GROUP MOUNTED

FIELD OF THE INVENTION

This invention relates to an improved switchboard for mounting, and supplying electrical power to, a plurality of circuit breakers. In this particular invention the switchboard includes a power stack assembly defining a plurality of ventilation passageways to facilitate cooling of the power stack and the breakers mounted thereon. The circuit breakers are installed in a single row.

BACKGROUND OF THE INVENTION

Switchboards for mounting and supplying electrical power to a plurality of circuit breakers are well known in the art. However, the total amperage which can be handled by a switchboard is limited due to heat radiated by the breakers. In this regard, attempts in the 1970's to develop a 3,000 ampere alternating current switchboard failed due to excessive heat within the circuit breakers. More specifically, the failure was in meeting the specified Underwriters Laboratories temperature limits on the circuit breaker load cables, or at the line side plug-on connectors. Moreover, heretofore access to the various lug assemblies of conventional switchboards has been restrictive, making cable connections and other wiring tasks difficult and time consuming.

U.S. Pat. No. 5,166,861 issued to the inventor of the present application discloses a switchboard which provides for cooler circuit breaker operation, such that a longer power stack can be used and more and larger circuit breakers can be mounted in a single switchboard. It discloses a switchboard that is inexpensive to manufacture and maintain that affords ready access to the neutral bus bar assembly, the ground bus lug mounting assembly, and the other components of the switchboard.

The switchboard of the '861 patent comprises a frame including a center mounting pan, and including at least first and second circuit breaker mounting pans for engaging and supporting the rear end portions of the circuit breakers. The first circuit breaker mounting pan is selectively spaced from the center mounting pan so as to define an open area therebetween, and the second circuit breaker mounting pan is oppositely disposed with respect to the first circuit breaker mounting pan relative to the center mounting pan and is selectively spaced from the center mounting pan so as to define an open area therebetween. The switchboard also comprises a power stack assembly mounted on the center mounting pan of the frame. The power stack assembly includes first, second and third, substantially vertical, elongated main bus bar members for being connected to a source of electrical power and for releasably engaging the circuit breakers. The first main bus bar member is selectively spaced from the center mounting pan with insulator members so as to define a first ventilation passageway therebetween. The second main bus bar member is selectively spaced from the first main bus bar member with insulator members so as to define a second ventilation passageway therebetween. Similarly, the third main bus bar member is selectively spaced from the second main bus bar member with insulator members so as to define a third ventilation passageway therebetween. The power stack assembly further including a channel vent cover selectively spaced from the third main bus bar member with insulating members so as to define a forth ventilation passageway therebetween. Each of the first, second and third ventilation passageways defines an opening at the lower end of the power stack assembly and an opening at the upper end of the power stack assembly. The fourth ventilation passageway defines an opening proximate the lower end of the channel vent cover and an opening proximate the upper end of the channel vent cover. Resultantly, convection air is allowed to rise within the ventilation passageways to cool the power stack assembly. In addition, the center mounting pan and the main bus bars are provided with ventilation openings along their lengths to further facilitate air flow through the power stack assembly.

As illustrated in FIGS. 1 and 2 the switchboard 10 of the '861 patent is provided with a front assembly, including, in the preferred embodiment, upper and lower vented covers 30 and 32, respectively, and top and bottom covers 34 and 36, respectively, which are engaged to and extend between the front portions of the vertical support channels 18 and 20. Also included are removable cover panels 38, 40 and 42, which provide access to various components of the switchboard 10. Further, as illustrated by the phantom lines 44 in FIG. 2, the switchboard 10 can also be provided with a suitable enclosure for housing the frame 16 and various components of the switchboard 10. It will be recognized that the enclosure 44 can be formed by securing wall panels to the frame 16.

Located behind the panel 40 of switchboard 10 is a power stack assembly 12 for releasably mounting the circuit breakers 14. As shown in FIG. 3 the multi-pan mounting assembly includes a center pan 46 which supports the power stack assembly 12. The center pan 46 is secured to the mounting channels 22 of the frame 16 such that the center pan 46 is vertically disposed. Further, the center pan 46 is provided with a plurality of selectively spaced holes (not shown) for receiving suitable fasteners for securing the power stack assembly 12, and a plurality of ventilation openings (not shown) for providing air circulation through the power stack assembly 12.

As best illustrated in FIG. 3, the power stack assembly 12 includes three vertically disposed main bus bars 52, 54 and 56 to accommodate a three phase power supply. The main bus bars 52, 54 and 56 are secured together in selectively spaced, substantially parallel alignment with insulating means being provided between the bus bars to electrically insulate the bus bars from one another. The resulting assembly 12 is secured, in selectively spaced, substantially parallel alignment, to the center pan 46, with suitable insulation means being provided between the inner bus bar 52 and the center pan 46.

As seen in FIG. 3, the main bus bar 56 is connected to a main bus connecting member 124 which consists of a pair of vertically separated connecting members for conveying power from a through bus connector at the rear of the circuit breaker (not shown) to the bus bar 56: the through bus connector is in turn connected to one of the phases of the power supply. The use of a pair of main bus connecting members is required to handle the power requirements while, at the same time, avoiding an excessive temperature rise. Other main bus connecting members, located behind the main bus connecting member 124, provide power connection to the main bus bars 52 and 54 for the other two phases. Further, a stack top channel vent cover 88 is provided to cover the outer bus bar 56, with two spaced rows of outer insulating members 90 being provided between the bus bar 56 and the cover 88. The bus bars 52, 54 and 56, and the cover 88, with insulating members therebetween, are secured together and mounted on the center pan 46 with suitable fasteners (not shown in FIG. 3).

The main bus connecting members in the '861 invention are connected to corresponding lug pad connectors secured to a bus support channel carrying three lug pads: the lug pads, in turn, facilitate the connection of electrical cables from the electrical supply source.

As seen in FIGS. 1–3, circuit breakers are arranged on both sides of the power stack assembly 12. Due to the location of thee main bus connecting members on the right side of the switchboard when viewed from the front, there is less space available for mounting circuit breakers on the rights side of the power stack assembly 12. The circuit breakers 14 are provided with electrical connecting jaws (not shown) which releasably engage the outer edges (not shown) of the bus bars 52, 54 and 56. Suitable provision is made for supporting the circuit breakers by means of additional mounting pans.

It would be desirable to have a switchboard with increased height so as to be able to include additional circuit breakers in the switchboard. Such a switchboard should have improved heat dissipation capacity and have complete flexibility in the position of the circuit breakers. Such a switchboard should preferably use less material without a significant reduction in the electrical capacity. It would also be desirable to have a switchboard that provides increased flexibility to the user on the height at which power is input to the assembly. The present invention satisfies these requirement.

SUMMARY OF THE INVENTION

The present invention is a switchboard for mounting and supplying electrical power to a plurality of circuit breakers. The improved air flow design allows for an increased height of the assembly and the mounting of breakers of any size to be mounted in any location on a vertical powerstack. All the breakers are mounted on one side of the power stack. The individual circuit breaker performance of the present invention that is rated at 2000 amperes is identical to that in the '861 patent, rated at 3000 amperes. The individual circuit breaker performance is accomplished using less (copper) conductor material, especially in the main bus connecting members. The main bus connecting members on the other side of the power stack from the breakers and are spaced apart vertically to allow for improved heat dissipation. Separate through bus connectors are used on the back of the power stack for connecting to the external power source, the position of the through bus connectors being adjustable. The connectors to the through bus are considerably reduced in size from prior art due to a different orientation of the main bus connectors relative to the through bus. The circuit breaker at the highest location (the "A" phase) has the highest temperature and in the present invention, the main bus connecting member for the A phase is in the highest position to place it closest to the heat source and thereby improve the heat conduction away from the breakers. The location of the breakers on one side of the power stack allows the switchboard to be narrower. The depth of the enclosure is also reduced due to the improved heat conduction. A vertical ventilation passageway on the right side of the power stack (where the bus connecting members are located) provides further improvement in heat dissipation.

BRIEF DESCRIPTION OF THE DRAWINGS

The above mentioned features of the invention will be more clearly understood from the following detailed description of the invention read together with the drawings in which:

FIGS. 8A and 8B are views of the arrangement for connecting the power stack assembly to buses located at the middle of the switchboard.

DETAILED DESCRIPTION OF THE PRESENT INVENTION

The present invention is an improvement of the invention described in U.S. Pat. No. 5,166,861, assigned to the owner of the present invention and the disclosure therein is explicitly included here by reference. A switchboard incorporating various features of the present invention is illustrated at 210 in FIG. 4. The switchboard 210 includes a substantially vertical power stack assembly discussed below which accommodates the installation and electrical connection of a plurality of circuit breakers 214. The circuit breakers are connected to load centers (not shown) by suitable electrical conductors (not shown). As discussed in detail below and in U.S. Pat. No. 5,166,861, the construction of the power stack assembly and the use of a multi-pan mounting assembly for mounting the power stack assembly and circuit breakers provides for cooler circuit breaker operation.

Figure 1:
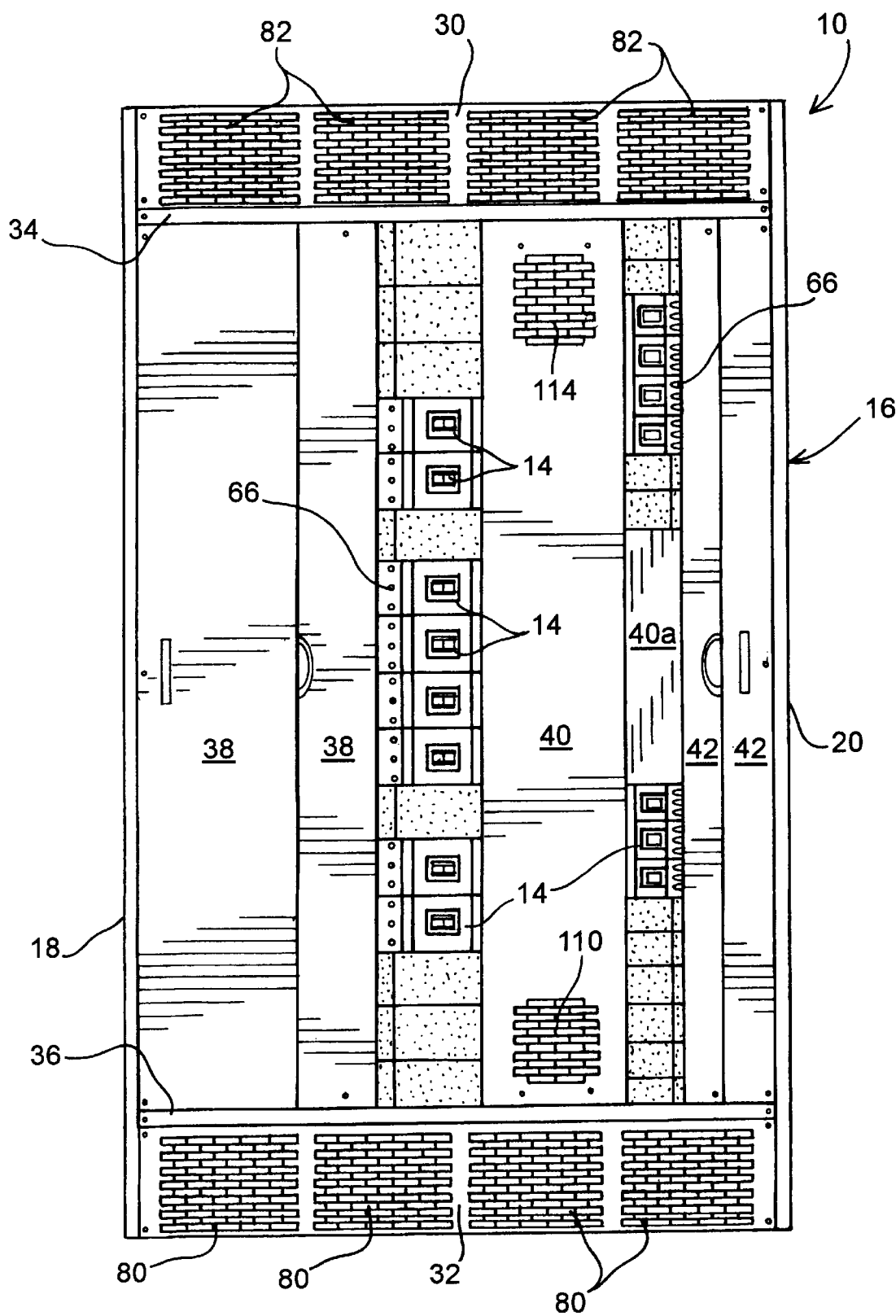
FIG. 1 (Prior Art) illustrates a front view of a switchboard of a prior art invention.
Figure 2:
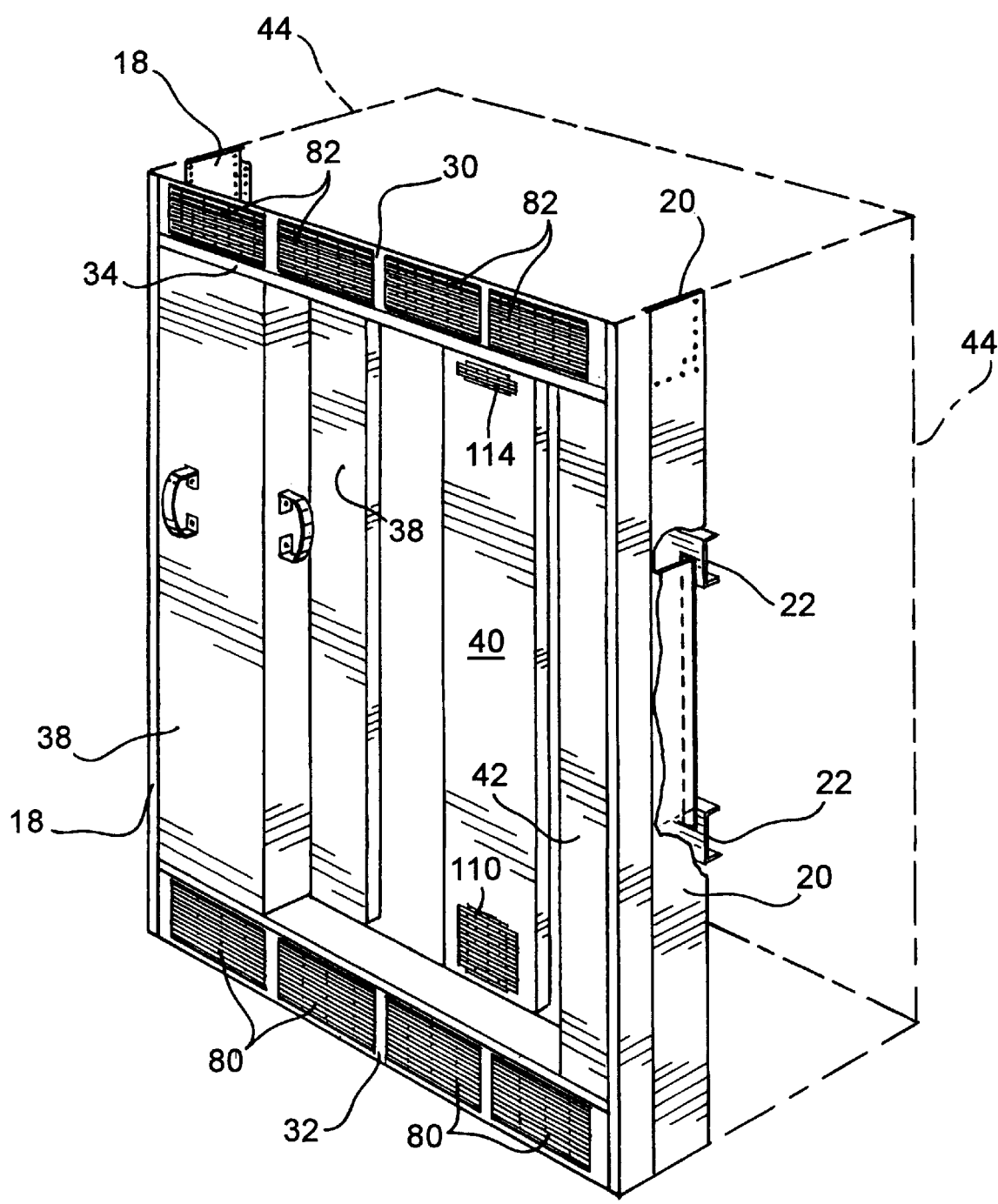
FIG. 2 (Prior Art) illustrates a partial perspective view of the switchboard of the prior art invention.
Figure 3:
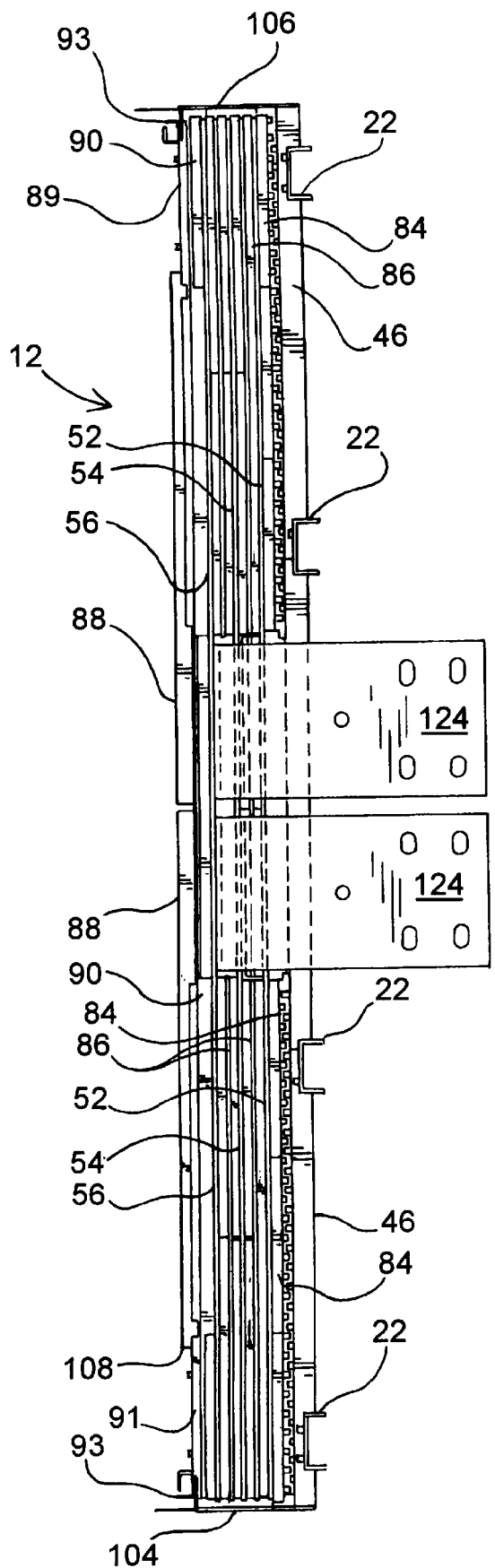
FIG. 3 (Prior Art) illustrates a side elevation view of a portion of the frame and power stack assembly of the switchboard of the prior art invention.
Figure 4:
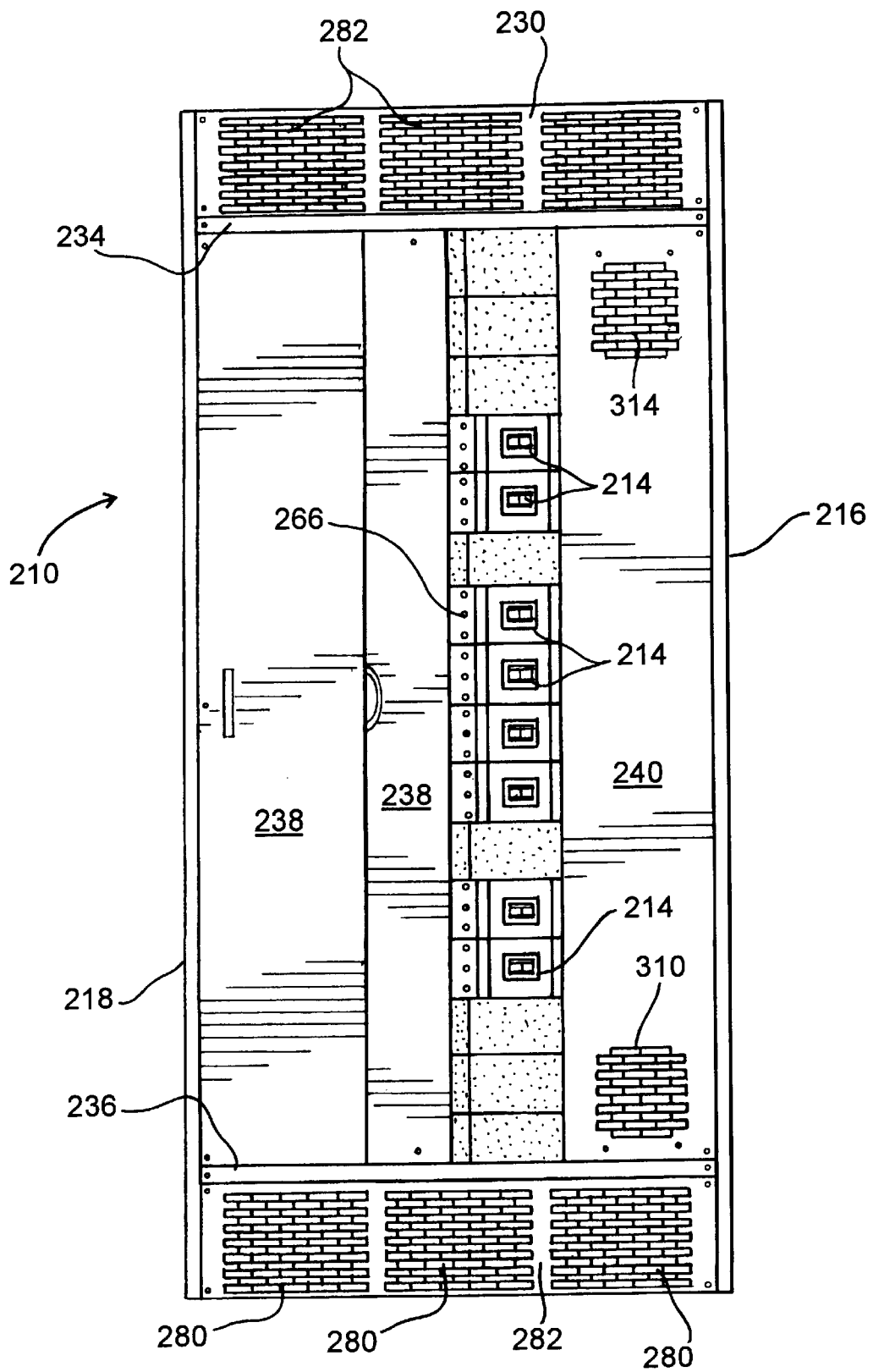
FIG. 4 illustrates a front view of a switchboard of the present invention.

As illustrated in FIG. 4 the switchboard 210 is provided with a front assembly, including, in the preferred embodiment, upper and lower vented covers 230 and 232, respectively, and top and bottom covers 234 and 236, respectively, which are engaged to and extend between the front portions of the vertical support channels (not shown here). Also included are removable cover panels 238, 240 and 242, which provide access to various components of the switchboard 210. Further, the switchboard 210 can also be provided with a suitable enclosure for housing the frame (not shown) and various components of the switchboard 210. It will be recognized that the enclosure can be formed by securing wall panels to the frame.

Figure 5:
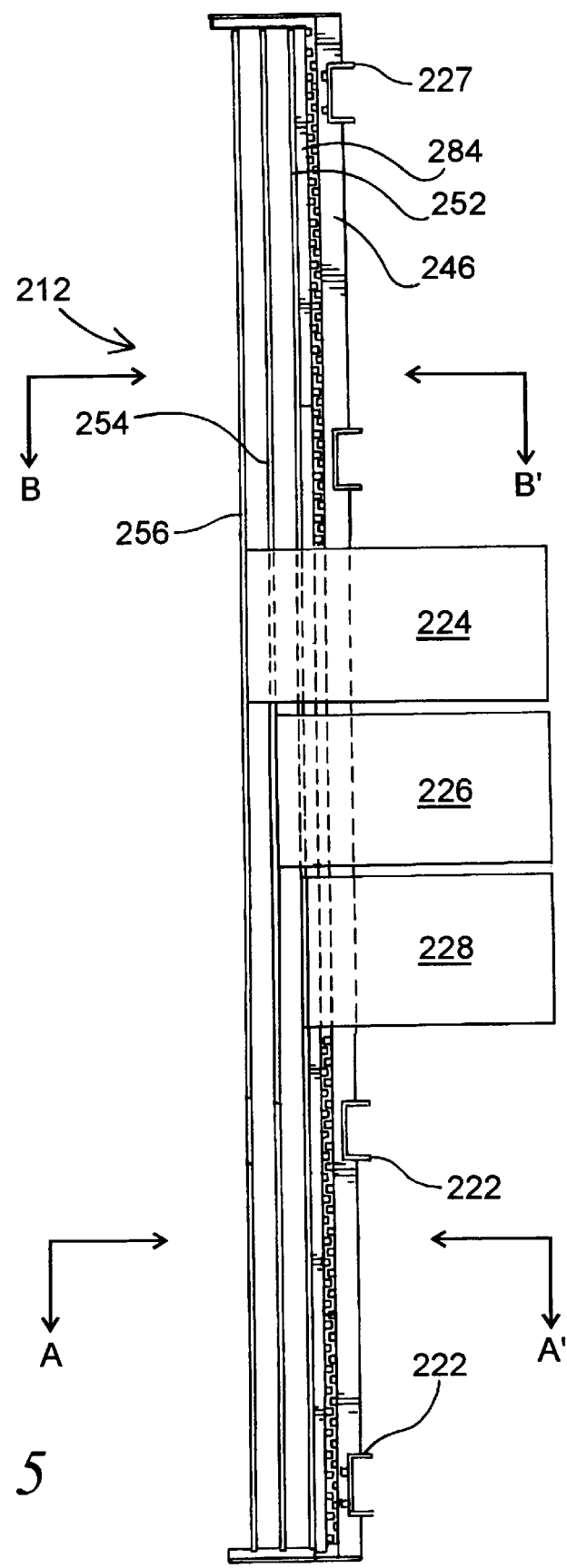
FIG. 5 illustrates a view of the power stack assembly of the present invention.
Figure 6:
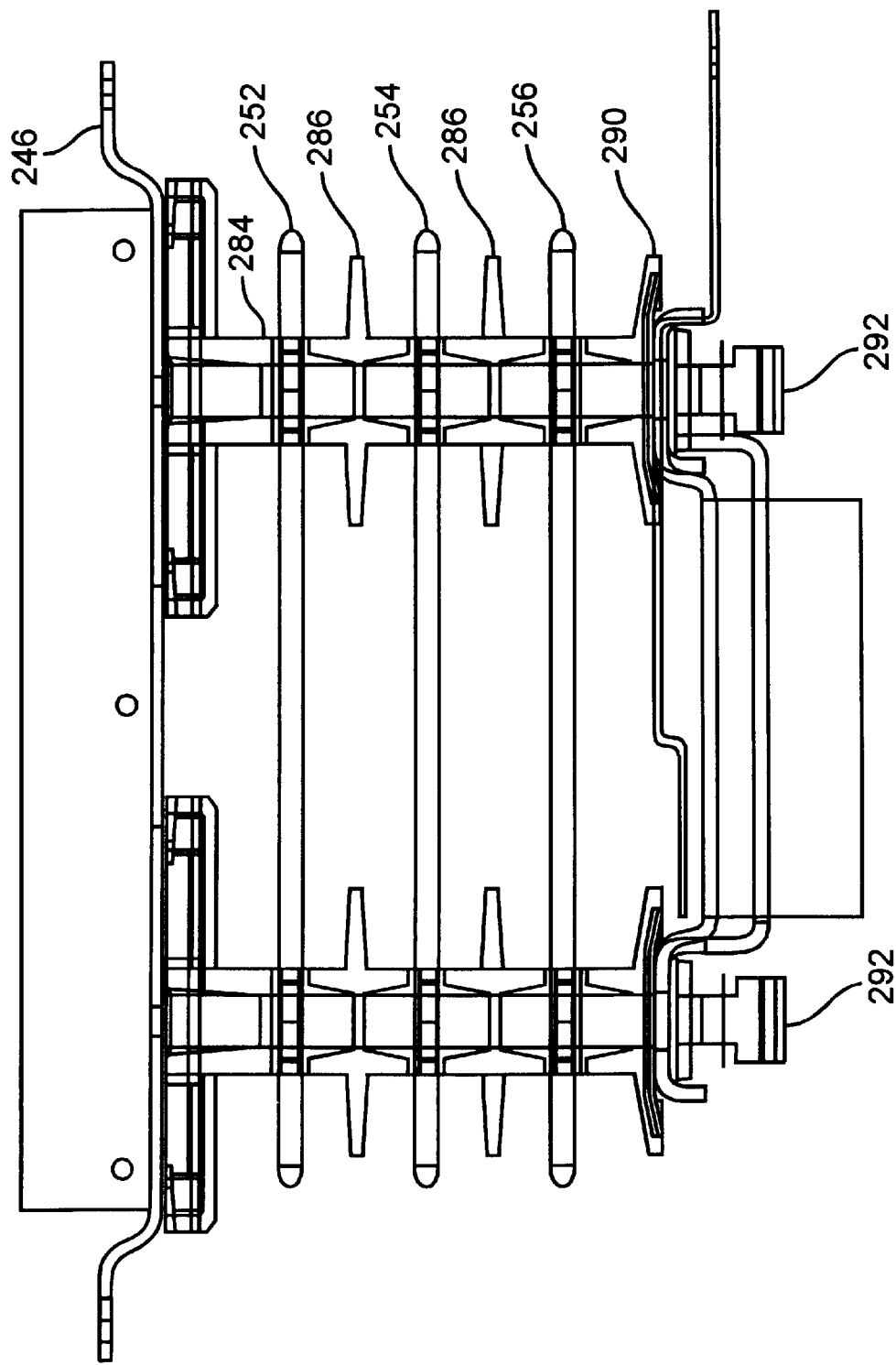
FIG. 6 is a sectional view of the power stack assembly of the present invention near the bottom of the assembly.

FIG. 5 is a view of the power stack of the present invention comparable to FIG. 6 of the '861 patent. Shown are the three main bus bars 252, 254 and 256 of the power stack 212. The center pan 246 and the mounting channels 222. In the present invention, the main bus connecting members 224, 226, and 228 are vertically separated instead of being at the same height. The inner insulating member 284 between the bus bar 252 and the center pan 246 is also shown but for the sake of simplifying the invention, the intermediate insulating members located between the bus bars is not shown in this illustration.

FIG. 6 is a sectional view taken at A—A' of FIG. 5 showing the manner in which the bus bars 252, 254, and 256 are mounted to the mounting pan 246 by means of bolts 292. Also shown are the inner insulating member 284 between the mounting pan 246 and the bus bar 252, the intermediate insulating members 286 and the outer insulating member 290.

Figure 7:
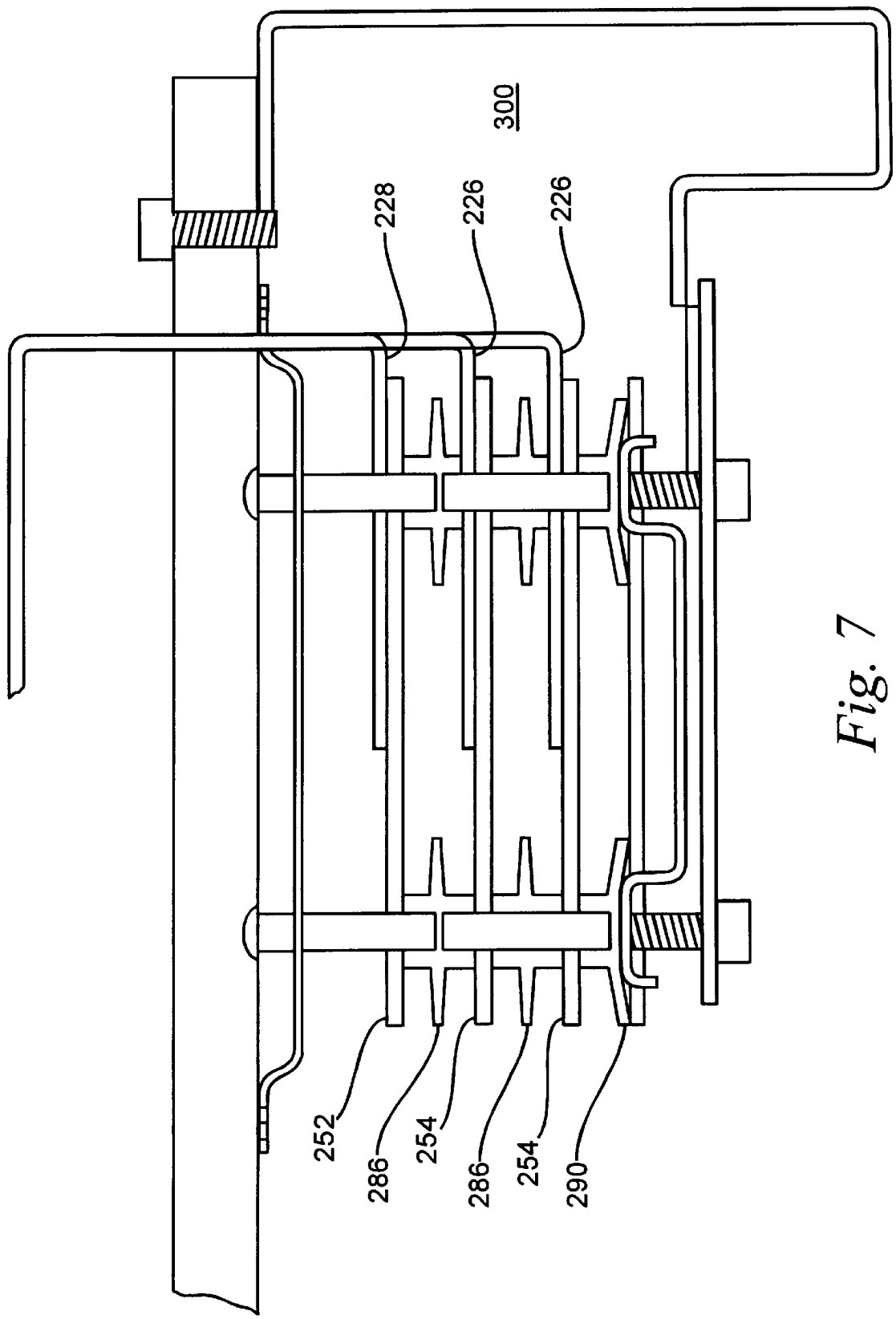
FIG. 7 is a sectional view of the power stack assembly of the present invention near the top of the assembly.

FIG. 7 is another sectional view of the stack of FIG. 5 taken at B—B' showing the disposition of the bus connecting members 224, 226, and 228, the bus bars 252, 254 and 256. Also shown is a region 300 that defines a vertical chimney for the circulation of air between the power stack assembly 212 and the support frame 16.

With the arrangement of the main bus bars, the bus connecting members and the insulating members, the power stack assembly is provided with adequate ventilation as described in the '641 patent. It will be recognized that a significant amount of radiated heat is removed from the proximity of the power stack assembly through such advantageous movement of convection air through the power stack assembly 212 The resultant decrease in operating temperature allows the power stack assembly 212 to be greater in length than conventional power stack assemblies so as to accommodate larger circuit breakers, and a greater number of circuit breakers, without excessive heat buildup. It will also be recognized that in the prior art arrangement, the bus connecting members are disposed with their vertical faces in close proximity to each other. This arrangement leads to a higher temperature buildup than the present arrangement where the bus connecting members are spaced apart vertically with their horizontal faces in proximity. In addition, the unobstructed chimney between the power stack assembly and the outer frame provides another avenue for heat dissipation through convection and radiation. As a result of this, the bus connecting members in the present invention may be made with a significantly smaller cross section than the dual members in prior art: this leads to a considerable reduction in the amount of material required.

It will also be apparent to those versed in the art that when the circuit breakers are arranged with the "A" phase on top, a corresponding arrangement of the bus connecting members, i.e., with the A phase bus connecting member at the top, leads to efficient heat removal from the circuit breakers and the power stack assembly.

Figure 8B:
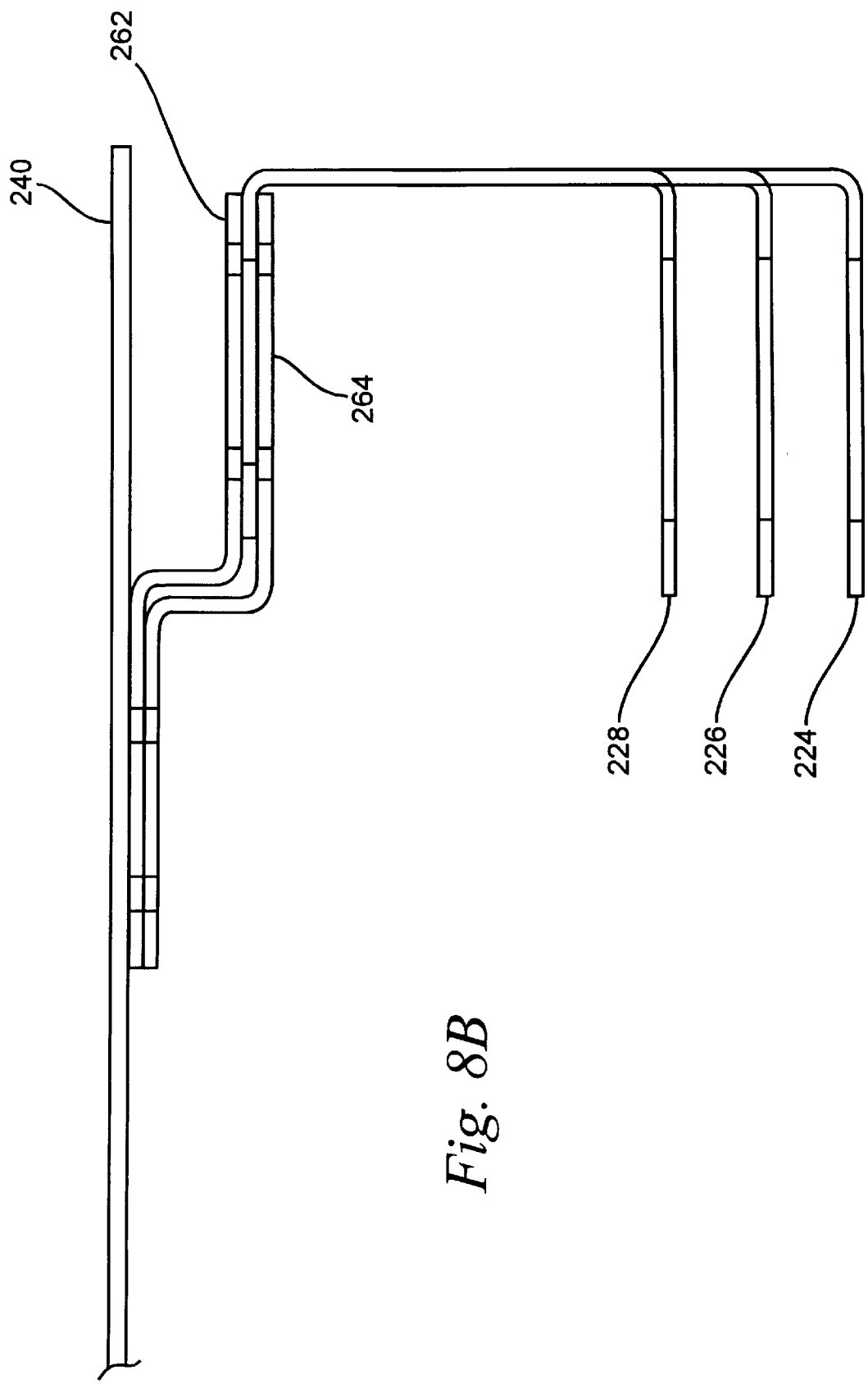

FIGS. 8A and 8B show views of the bus connecting members 224,226,228 and their connection to through buses, labeled here as 244, 246 and 248, that may be connected to the three phases of an external power source (not shown). Also shown is a through bus 249 for the neutral line. Each of the bus connecting members is connected to its corresponding through bus by a front connector 264 and a rear connector 262 This arrangement is used when the through buses are positioned at the middle of the circuit breaker assembly. For simplifying the illustration, the power stack assembly is not shown in FIGS. 8A and 8B.

Figure 9A:
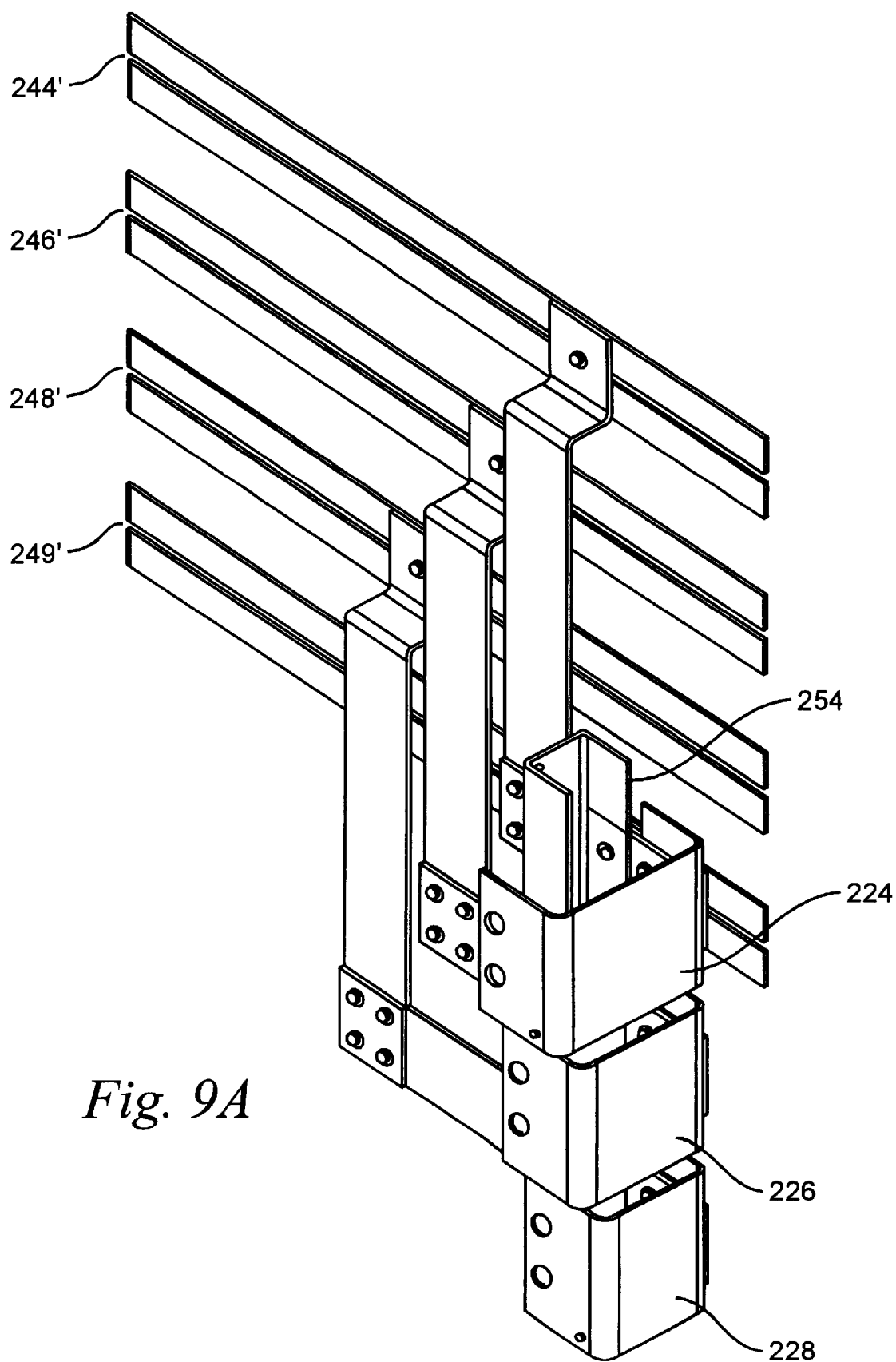
FIGS. 9A, 9B and 9C are views of the arrangement for connecting the power stack assembly to buses located at the top of the switchboard.
Figure 9B:
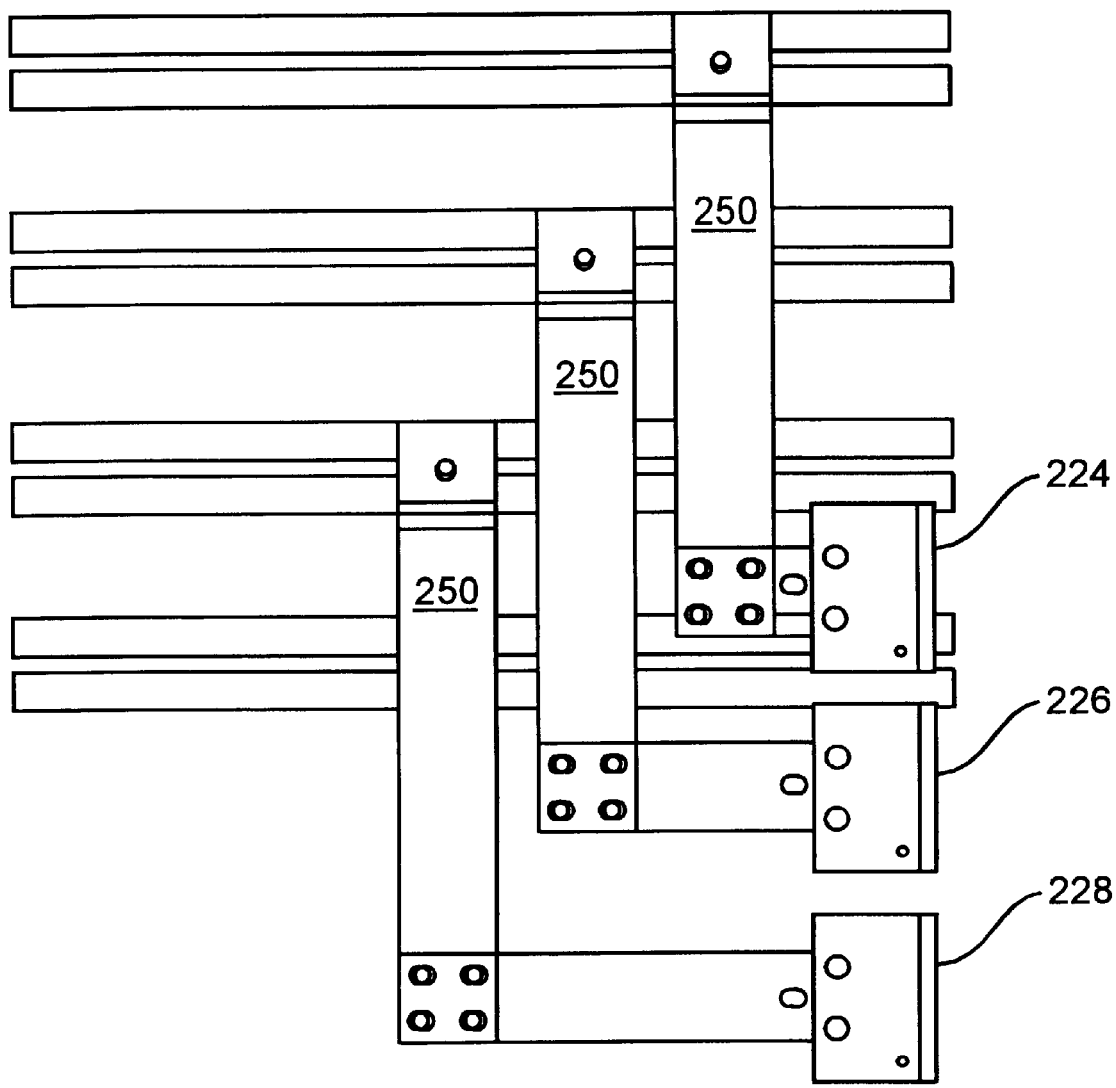
Figure 9C:
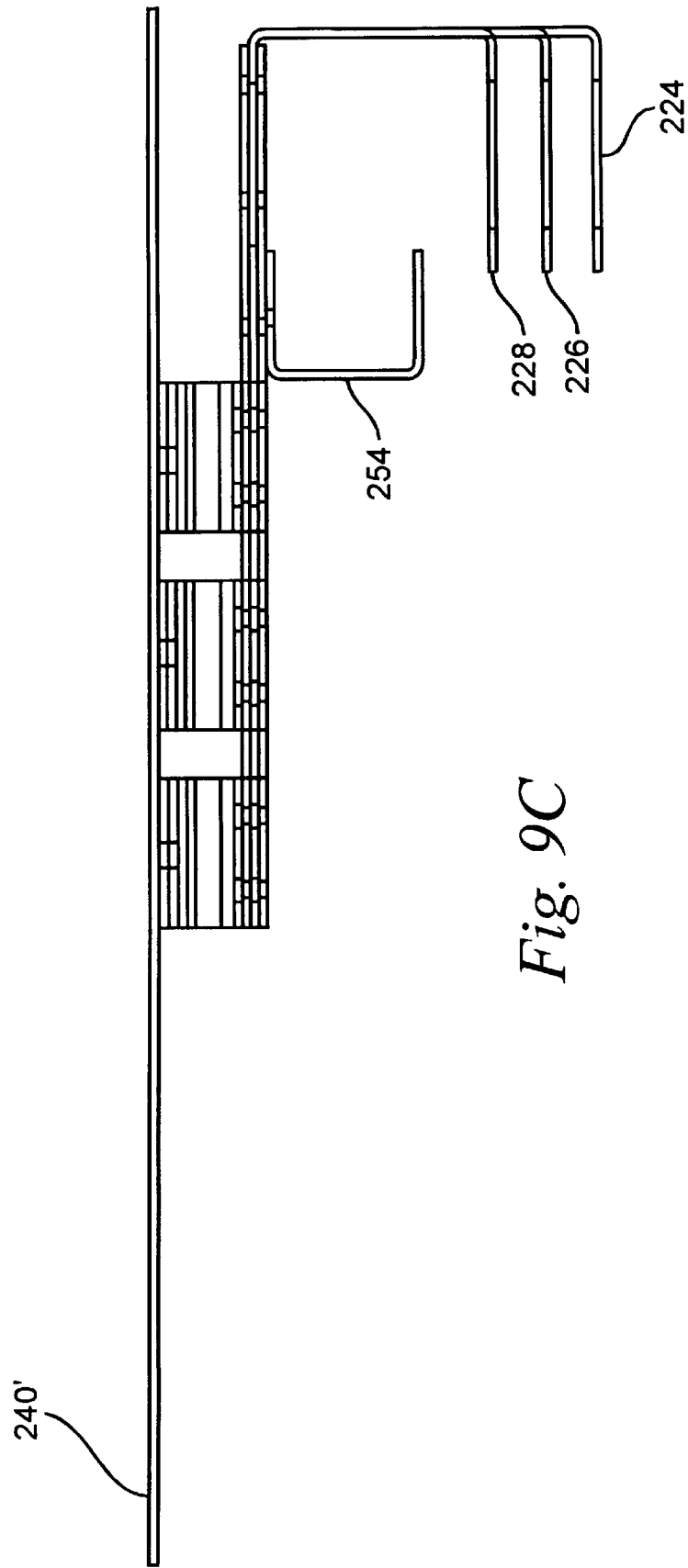

FIGS. 9A, 9B and 9C show the method of connecting the bus connecting members 224,226,228 to through buses that are positioned near the top of the circuit breaker assembly. By using additional vertical bus connecting members 250, the bus connecting members 224,226,228 may be connected to the through buses 244', 246' and 248' that are positioned near the top of the switchboard. A single insulated composite material channel 254 supports the three phases for short circuit forces. This simple design is accomplished by mounting the through buses edge to edge from the main bus connecting members. A similar arrangement may be made with vertical bus connecting members when the through buses are positioned near the bottom of the switchboard. Thus, the present invention provides an arrangement wherein the needs of the individual user with respect to the height at which the power supply comes to the switchboard by using easily machined and substantially similar or identical connecting members.

However, while a preferred embodiment has been shown and described, it will be understood that there is no intent to limit the invention to such disclosure, but rather it is intended to cover all modifications and alternate constructions falling within the spirit and scope of the invention as defined in the appended claims.

What is claimed is:

1. A switchboard for supplying electrical power from a power source to a plurality of load centers, said switchboard comprising:
   (a) a power stack assembly including a plurality of substantially vertically disposed elongated main bus bar members for distributing electrical power to the load centers;
   (b) at least one circuit breaker releasably connected to at least one of the plurality of main bus bar members, said at least one circuit breaker located on a first side of the power stack assembly, said at least one circuit breaker providing an interruptible connection from the at least one of the main bus bar members to one of the external load centers;
   (c) a plurality of through bus members, each of said through bus members receiving electrical power from a different phase of a source of electrical power; and
   (d) a plurality of substantially vertically spaced apart bus connecting members disposed on a second side of the power stack assembly opposite the first side, each said bus connecting member conveying electrical power from one of the through bus member to one of the main bus members.

2. The switchboard of claim 1 further comprising a substantially vertical passage proximate to the bus connecting members for allowing flow of air therein to cool the bus connecting members.

3. The switchboard of claim 1 wherein the at least one circuit breaker is mounted on a circuit breaker pan.

4. The switchboard of claim 1 wherein
   (i) the at least one circuit breaker further comprises a plurality of circuit breakers, one of said plurality of circuit breakers corresponding to an "A" phase of the source of electrical power at an uppermost position of the positions of the plurality of circuit breakers, and
   (ii) the uppermost of the plurality of spaced apart bus connecting members is operatively coupled to the "A" phase of the source of electrical power for providing heat conduction away from the circuit breaker at the uppermost position.

5. The switchboard of claim 1 wherein each of the plurality of bus connecting members is a single jointed member for reducing the amount of material required therefor.

6. The switchboard of claim 1 wherein the plurality of through bus members and the plurality of bus connecting members are at a position near the middle of the power stack assembly.

7. The switchboard of claim 1 wherein the plurality of bus connecting members are at a position near the middle of the power stack assembly and the plurality of through bus members are at a position selected from (i) near the top of the power stack assembly, and (ii) near the bottom of the power stack assembly.

8. The switchboard of claim 7 further comprising a plurality of vertical bus connecting members for connecting the through bus members to the bus connecting members for providing flexibility in the location of the through bus connecting members.

9. The switchboard of claim 8 further comprising an insulating channel made of composite material for supporting the plurality of vertical bus connecting members.

10. The switchboard of claim 6 further comprising a front connecting member and a rear connecting member for connecting each of the plurality of bus connecting members to a corresponding through bus member for simplifying the connection therebetween.

11. A switchboard for mounting and supplying electrical power to a plurality of circuit breakers, said switchboard comprising:

(a) a frame including a center mounting pan and at least one circuit breaker mounting pan selectively spaced from said center mounting pan for supporting said circuit breakers, said center mounting pan and said at least one circuit breaker mounting pan defining an open area between said center mounting pan and said one circuit breaker mounting pan whereby convection air flow is allowed to wash over back surfaces of said circuit breakers and heat radiated by said back surfaces is allowed to transfer to rearward structures of said switchboard;

(b) a power stack assembly, having an upper end and a lower end, mounted on said frame, said power stack assembly including a plurality of substantially vertically disposed elongated main bus bar members releasably engaging said circuit breakers, said main bus bar members being selectively spaced with insulators therebetween such that ventilation passageways are defined between said main bus bar members, each said ventilation passageway defining an opening proximate said lower end of said power stack assembly and an opening proximate said upper end of said power stack assembly whereby convection air is allowed to rise within said ventilation passageways to cool said power stack assembly, and wherein the plurality of circuit breakers are disposed on a first side of the power stack assembly;

(c) a plurality of through bus members spaced apart vertically, said plurality of through bus members mounted on an outer enclosure and connected to a source of electrical power; and (d) a plurality of vertically spaced apart bus connecting members disposed on a second side of the power stack assembly opposite the first side for allowing efficient heat conduction away from the circuit breakers, each said bus connecting member conveying electrical power from one of the through bus member to one of the main bus members.

12. The switchboard of claim 11 further comprising a substantially vertical passage proximate to the bus connecting members for passage of air therein for improving the transfer of heat therefrom.

13. The switchboard of claim 11 wherein the at least one circuit breaker pan comprises a plurality of circuit breaker pans disposed on a second side of the power stack assembly opposite the first side.

14. The switchboard of claim 1 wherein a breaker corresponding to an "A" phase of the source of electrical power is at an uppermost position of the positions of the plurality of circuit breakers, and the uppermost of the plurality of spaced apart bus connecting members is operatively coupled to the "A" phase of the source of electrical power for providing heat conduction away from the circuit breaker at the uppermost position.

15. The switchboard of claim 11 wherein each of the plurality of bus connecting members is a single jointed member for reducing the amount of material required therefor.

16. The switchboard of claim 11 wherein the plurality of through bus members and the plurality of bus connecting members are at a position near the middle of the power stack assembly.

17. The switchboard of claim 11 wherein the plurality of bus connecting members is at a position near the middle of the power stack assembly and the plurality of through bus members is at a position selected from (i) near the top of the power stack assembly, and (ii) near the bottom of the power stack assembly.

18. The switchboard of claim 7 further comprising a plurality of vertical bus connecting members for connecting the through bus members to the bus connecting members for providing flexibility in the location of the through bus connecting members.

19. The switchboard of claim 8 further comprising an insulating channel made of composite material for supporting the plurality of vertical bus connecting members.

* * * * *